United States Patent
Oukid et al.

(10) Patent No.: US 10,168,911 B1
(45) Date of Patent: Jan. 1, 2019

(54) DEFRAGMENTATION OF PERSISTENT MAIN MEMORY

(71) Applicant: SAP SE, Walldorf (DE)

(72) Inventors: Ismail Oukid, Leimen (DE); Ivan Schreter, Malsch (DE); Daniel Booss, Wiesloch (DE)

(73) Assignee: SAP SE (DE)

( * ) Notice: Subject to any disclaimer, the term of this patent is extended or adjusted under 35 U.S.C. 154(b) by 18 days.

(21) Appl. No.: 15/621,736

(22) Filed: Jun. 13, 2017

(51) Int. Cl.
*G06F 3/06* (2006.01)
*G06F 17/30* (2006.01)

(52) U.S. Cl.
CPC .......... *G06F 3/0608* (2013.01); *G06F 3/0631* (2013.01); *G06F 3/0641* (2013.01); *G06F 17/30327* (2013.01)

(58) Field of Classification Search
None
See application file for complete search history.

(56) References Cited

U.S. PATENT DOCUMENTS

| | | | | |
|---|---|---|---|---|
| 5,561,786 A * | 10/1996 | Morse | .................. | G06F 12/023 707/999.202 |
| 5,727,185 A * | 3/1998 | Mehner | ................ | G06F 12/023 711/170 |
| 5,870,751 A * | 2/1999 | Trotter | .............. | G06F 17/30604 |
| 6,175,900 B1 * | 1/2001 | Forin | .................... | G06F 12/023 707/999.202 |
| 6,687,687 B1 * | 2/2004 | Smadja | ............. | G06F 17/30631 |
| 2005/0076144 A1 * | 4/2005 | Boylan | ............. | H04L 29/12283 709/245 |
| 2006/0069898 A1 * | 3/2006 | Patel | ..................... | G06F 12/023 711/171 |
| 2010/0185690 A1 * | 7/2010 | Evans | ............... | G06F 17/30073 707/803 |

* cited by examiner

*Primary Examiner* — Kevin Verbrugge
(74) *Attorney, Agent, or Firm* — Sterne, Kessler, Goldstein & Fox, P.L.L.C.

(57) ABSTRACT

Disclosed herein are system, method, and computer program product embodiments for defragmentation of persistent main memory (e.g., storage class memory). An embodiment operates by determining that a request to allocate a block of persistent main memory cannot be fulfilled, identifying the largest block of a plurality of free blocks associated with a persistent allocator, and punching a hole at the location of the block within a segment of the persistent main memory. The embodiment further operates by determining that at least one neighboring block of the largest block is also a hole, and coalescing the at least one neighboring block and the largest block.

20 Claims, 5 Drawing Sheets

DEFRAGMENTATION OF PERSISTENT MAIN MEMORY

CROSS REFERENCE TO RELATED APPLICATIONS

This application is related to co-pending U.S. patent application Ser. No. 15/621,640, by Oukid, et al., "Big Block Allocation of Persistent Main Memory," filed herewith which is hereby incorporated by reference in its entirety.

BACKGROUND

Storage class memory (SCM) combines the low latency and byte-addressability of dynamic read access memory (DRAM) with the non-volatility, areal density, and economical characteristics of traditional storage media. Furthermore, given the byte-addressability and low latency of SCM technologies, central processing units (CPU) can access data stored in SCM without buffering the data in DRAM. Consequently, SCM technologies blur the distinction between computer memory and traditional storage media, and enable single level architectures without DRAM.

Over the course of repeated file allocation, data files stored on a persistent memory device (e.g., SCM) of a computing system can become fragmented. Furthermore, fragmentation can reduce the capacity and/or performance of the persistent memory device. Typically, file systems defragment persistent memory devices using virtual mappings to buffer pages in DRAM to transparently relocate fragmented physical memory pages. However, SCM is not buffered in DRAM, and thus cannot be defragmented by traditional file system techniques.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for defragmentation of persistent main memory.

Figure 1:
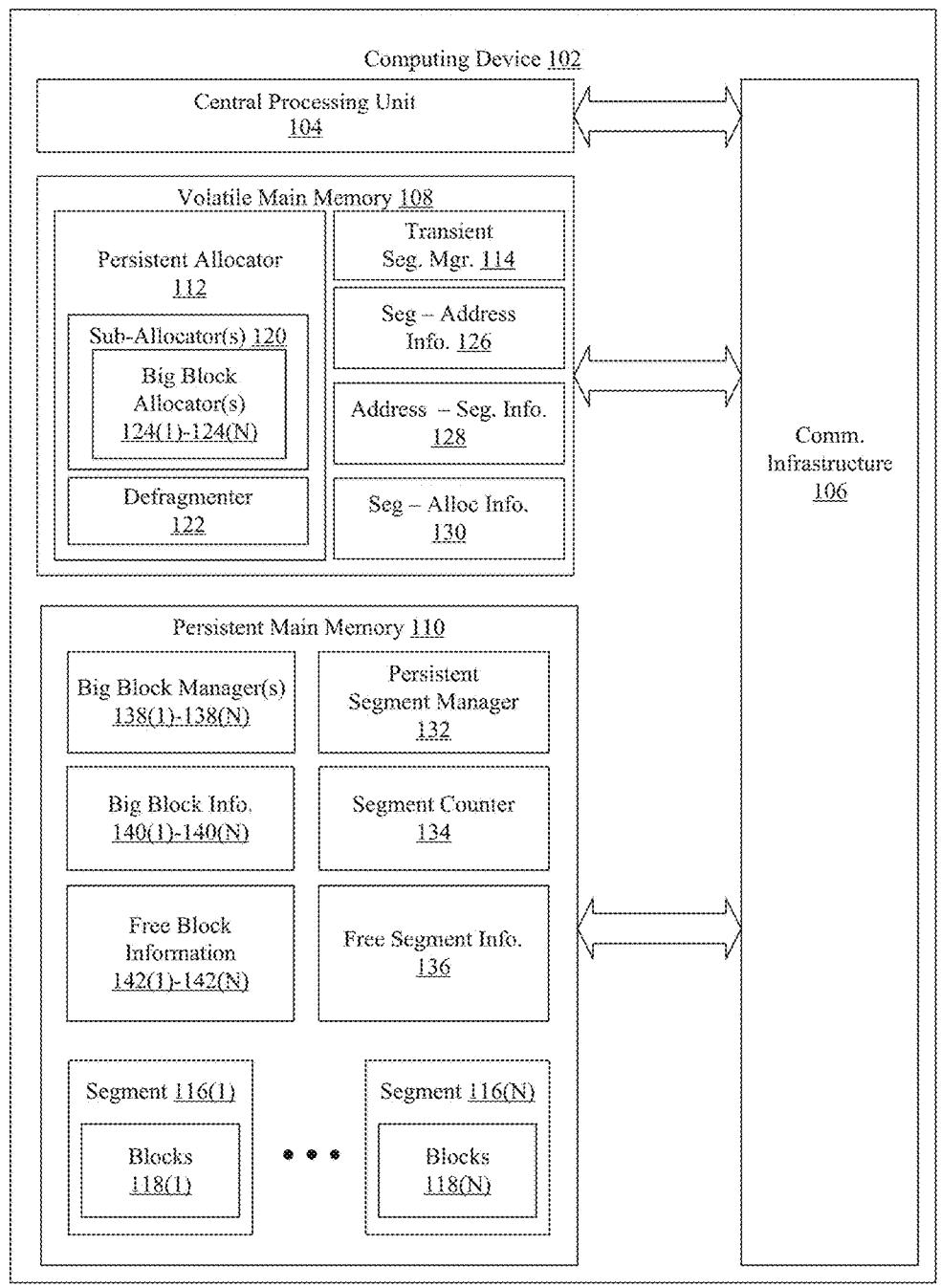
FIG. 1 illustrates select components of an exemplary computing system for providing defragmentation of persistent main memory, according to some embodiments.

FIG. 1 illustrates select components of an exemplary computing system 102 in which the embodiments described herein can be implemented. Some examples of the computing system 102 include computer servers, smart phones and mobile communication devices; tablet computing devices; desktops, laptops, netbooks and other portable computers, or other similar devices capable of accessing a data storage system for data read and data write operations. In some examples, the computing system 102 may be used to execute one or more processes associated with a database management application.

As shown in FIG. 1, the computing system 102 includes a central processing unit (CPU) 104, a communication infrastructure 106 (e.g., a system bus), volatile main memory 108 (e.g., dynamic random access memory (DRAM)), and persistent main memory 110 (i.e., SCM). Some examples of persistent main memory may include phase change memory, spin transfer torque random access memory, magnetic random access memory, and memristors. FIG. 1 further illustrates that the CPU 104, volatile main memory 108, and persistent main memory 110 are connected via the communication infrastructure 106.

The volatile main memory 108 includes a persistent allocator 112 and a transient segment manager 114. The persistent allocator 112 is a memory allocator that manages memory regions of the persistent main memory 110. For example, the persistent allocator 112 creates and memory maps segments on the persistent main memory 110 on an as-needed basis. As illustrated in FIG. 1, the persistent main memory 110 includes a plurality of segments 116 that may be created and memory mapped by the persistent allocator 112. Further, individual segments are comprised of a plurality of blocks 118 that may be allocated by the persistent allocator 112 to processes executing on the CPU. In some instances, the persistent main memory 110 may be managed by a file system optimized for byte-addressability non-volatile memory.

Processes executing on the CPU can access (i.e., read and write) data stored on the volatile main memory 108 and the persistent main memory 110 via pointers. For instance, once a process is allocated a block of the plurality of blocks 118, a file system may provide the process direct access to the block via memory mapping and a pointer associated with the block. As is well known to those skilled in the art, a process may have an associated address space that includes a set of virtual memory addresses that it can use during execution. Further, a virtual memory address does not represent the actual physical location of data in the volatile main memory 108 or the persistent main memory 110. Instead, the computing system relies on internal data structures to translate virtual addresses into their corresponding physical addresses on the volatile main memory 108 or the persistent main memory 110. Accordingly, each time a process references a virtual address, the computing system 102 translates the virtual address to a physical address.

Typically, when a process restarts or fails, virtual pointers previously associated with the process are rendered invalid because the process is provided a new virtual address space. As such, virtual pointers cannot reliably be used with persistent main memory because they cannot be used to recover persistent data structures. To solve this problem, an exemplary embodiment utilizes persistent pointers to reference persistent data structures, such as the plurality of blocks 118. In some examples, the persistent pointers consist of an 8-byte segment identifier and an 8-byte offset indicating the location of the block within the segment corresponding to the segment identifier. In some examples, persistent pointers may be used for allocation and deallocation of memory, while virtual pointers are used to read and write access of the allocated memory.

As shown in FIG. 1, the persistent allocator 112 includes a plurality of sub-allocators 120, and a defragmenter 122 that reduces fragmentation of the plurality of segments 116 of the persistent main memory 110 as will be discussed in greater detail below. In an exemplary embodiment, individual sub-allocators 120 receive allocation requests from the processes via the persistent allocator 112, and attempt to fulfill the requests. Fulfillment of an allocation request includes providing the requesting process a persistent pointer to a block of the plurality of blocks 118, the block having a size equal to or greater than a block size indicated in the request.

In some examples, the individual sub-allocators 120 have a designated block size range. For instance, the plurality of sub-allocators 120 may include one or more big block allocators 124 that perform allocations ranging from 16 KB to 16 MB. The plurality of sub-allocators 120 may additionally include one or more small block allocators that perform allocations ranging from 64 B to 16 KB, and a huge block allocator that performs allocations larger than 16 MB. Further, individual sub-allocators may implement different algorithms for allocating blocks to processes. For example, a big block allocator 124(1) may be a tree-based allocator that applies a best-fit algorithm for block allocation. As another example, the small block allocators may apply a segregated-fit algorithm. Further, the persistent allocator 112 may maintain one big block allocator 124 per CPU core and one small block allocator per CPU core in order to provide concurrent operation.

Additionally, the transient segment manager 114 maintains segment information corresponding to the plurality of segments 116 of the persistent main memory 110. For instance, the transient segment manager 114 maintains segment to virtual address information, virtual address to segment information 128, and segment to allocator information 130. The segment to virtual address information 126 maps segment identifiers to virtual addresses. In some cases, the segment to virtual address information 126 is used to convert a persistent pointer to its corresponding virtual address. The virtual address to segment information 128 maps virtual addresses to their corresponding segment identifiers and size. In some cases, the virtual address to segment information 128 may be used to convert a virtual address to its corresponding persistent pointer. The segment to allocator information 130 maps a segment identifier to a sub-allocator identifier.

In some examples, the individual segments 116 are not shared between the plurality of sub-allocators 120. For instance, the persistent allocator 112 may create a segment 116(1), and assign the segment 116(1) to a particular sub-allocator 120(1). Accordingly, the segment to allocator information 130 indicates that the segment 116(1) is assigned to a particular allocator 120(1). Once a segment 116(1) is assigned to a sub-allocator 120(1), the sub-allocator 120(1) is permitted to allocate blocks from the segment. Further, the sub-allocator 120(1) is responsible for deallocating blocks 118(1) associated with the segment 116(1).

Further, the persistent main memory 110 includes a persistent segment manager 132. The persistent segment manager 132 maintains a global segment counter 134, and free segment information 136. The global segment counter maintains a count of the current number of the plurality of segments 116. The free segment information 136 identifies the segments of the plurality of segments 116 that are not currently assigned to one of the plurality of sub-allocators 120. Further, the segments of the plurality of segments 116 identified in the free segment information 136 can be provided to one of the plurality of sub-allocators 120 upon request.

For example, the big block allocator 124(1) may receive a request for a block of a particular size. Further, the big block allocator 124(1) may determine that none of its segments include a block equal to or greater than the requested size. As a result, the big block allocator 124(1) may fetch a segment from the free segment information 136. Further, the persistent allocator 112 may update the free segment information 136 and the segment to allocator information 130 to reflect ownership of the segment by the big block allocator 124(1).

As shown in FIG. 1, the persistent main memory 110 also includes big block managers 138. Individual big block managers 138 are associated with particular big block allocators 124. For example, a first big block manager 138(1) is associated with a first big block allocator 124(1), an Nth big block manager 138(N) is associated with an Nth big block allocator 124(N), and so forth. Further, each big block manager 138 maintains big block information 140 that includes a topology representing the blocks associated with its corresponding big block allocator 124, and free block information 142 identifying the free blocks associated with its corresponding big block allocator 124. For example, first big block manager 138(1) maintains first big block information 140(1) and first free block information 142(1), an Nth big block manager 138(N) maintains Nth big block information 140(N) and Nth free block information 142(N), and so forth In some instances, the big block manager 138(1) may maintain the free block information 142(1) as a tree data structure representing the free blocks associated with the big block allocator 124(1). Further, individual nodes of the tree may include a persistent pointer to a block and the size of the block. Additionally, the big block manager 138(1) may maintain the big block information 140(1) as a tree data structure that stores pertinent information about the blocks associated with its corresponding big block allocator 124(1). Individual nodes of the tree may map the persistent pointer of a block to block attributes describing the block. In some instances, the block attributes are eight bytes long, and include the size of the block, an "isUsed" attribute indicating whether the block is currently allocated, an "isLastBlock" attribute indicating whether a block is at the end of a segment, and an "isHole" attribute indicating whether a block is a hole. As described herein, a hole includes unused storage capacity of a segment that resides amongst currently allocated blocks.

Figure 2A:
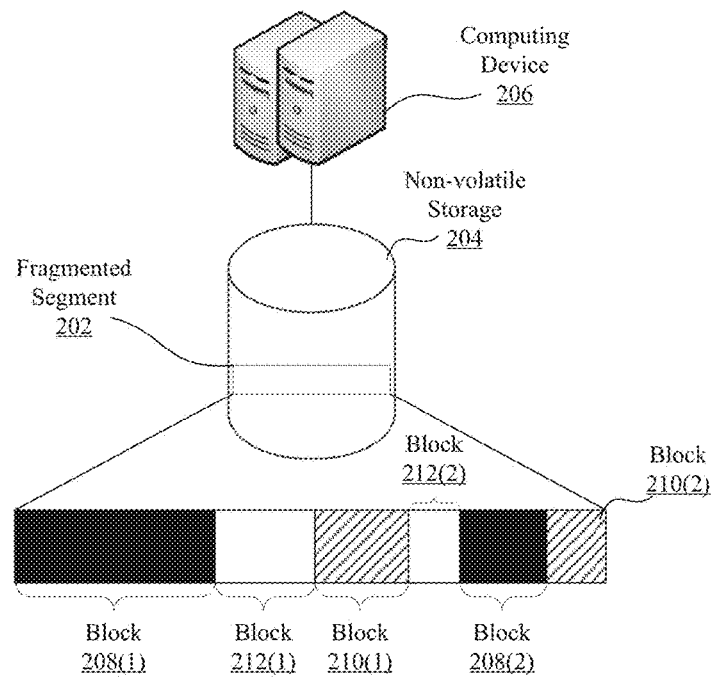
FIGS. 2A-2C depict an exemplary application of a defragmentation process to a fragmented segment, according to some embodiments.
Figure 2B:
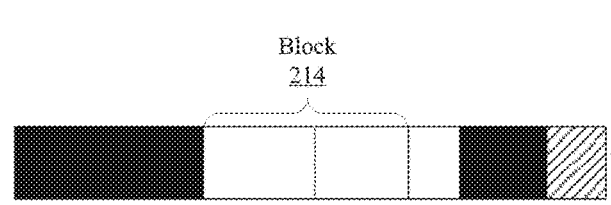
Figure 2C:
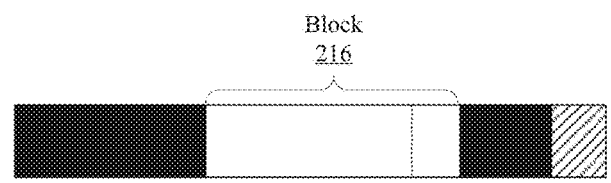

FIG. 2A illustrates a fragmented segment 202 of a non-volatile storage device 204. In contrast, FIG. 2B illustrates the segment 202 after a persistent allocator (e.g., the persistent allocator 112) performs first defragmentation steps on the segment 202. Further, FIG. 2C illustrates the fragment segment 202 after the persistent allocator performs second defragmentation steps on the segment 202.

As illustrated by FIG. 2A, a computing device 206 includes the non-volatile storage device 204, such as persistent main memory 110. Further, FIG. 2A illustrates that the non-volatile storage device 204 includes the segment 202. In some instances, the non-volatile storage device 204 may experience fragmentation. Fragmentation generally exist when only separate, discrete free blocks are available, rather than large continuous free blocks. When the non-volatile storage device 204 is fragmented, some allocation requests cannot be fulfilled and underutilization of the non-volatile storage device 204 can occur.

After a failure to fulfill an allocation request of a particular block size by the sub-allocators associated with the block size, a persistent allocator may perform a defragmentation process with respect to the requested block size. First, the persistent allocator 112 may determine whether the plurality of segments 116 include a free block larger or equal in size to the requested block size based on free block information, such as the free block information 142. If the persistent allocator 112 determines there is not a free block available to fulfill the request, the persistent allocator 112 may request a new segment from the transient segment manager 114. If the transient segment manager 114 is unable to provide a new segment, the persistent allocator 112 may defragment segments assigned to a sub-allocator associated with the requested block size.

For instance, due to the fragmentation of the segment 202, the big block allocators 124 may be unable to fulfill an allocation request for a block of size 15 MB. For example, the persistent allocator 112 may determine that there is no free block available having a size capable of fulfilling the allocation request, and the transient segment manager 114 may be unable to provide a new segment. As a result, the persistent allocator 112 may perform a defragmentation process on the segment 202. As illustrated in FIG. 2A, the segment 202 includes six blocks. Block 208(1) and block 208(2) are allocated, block 210(1) and block 210(2) are free, while block 212(1) and block 212(2) are holes.

In order to defragment the segment 202, the persistent allocator 112 identifies the largest free block in the segment 202, the segment 202 associated with the big block allocator 124(1). For example, the defragmenter 122 may determine that block 210(1) is the largest free block in the segment 202 based upon the big block information 140(1) and the free block information 142(1). Further, the persistent allocator 112 may update the information associated with the block 210(1) to indicate that the block 210(1) is a hole. For instance, the persistent allocator 112 may instruct the big block manager 138(1) to modify the big block information 140(1) to indicate that the block 210(1) is a hole, and remove an identifier of the block 210(1) from the free block information 142(1). Additionally, the persistent allocator 112 may modify the segment 202 by punching a hole at the location of the block 210(1). For example, the defragmenter 122 may call a fallocate call with the flags FALLOC FL PUNCH HOLE and FALLOC FL KEEP SIZE. In some cases, hole punching logically zeroes the contents of the block 210(1), and returns the capacity of the block 210(1) to the free space of the non-volatile storage device 204.

Further, the persistent allocator 112 may determine that the neighboring block 212(1) to the left of the block 210(1) is a hole based on the big block information 140(1) corresponding to the block 212(1). Further, the persistent allocator 112 may coalesce the block 210(1) and the block 212(1) to form a larger block 214 by increasing the size of the block 210(1) in the big block information 140(1) to include the size of the block 212(1), and deleting the big block information 140(1) corresponding to the block 212(1). The result of the aforementioned steps is illustrated in FIG. 2B.

Further, the persistent allocator 112 may determine that the neighboring block 212(2) to the right of the block 210(1) is a hole based on the big block information 140(1) corresponding to the block 212(2). Further, the persistent allocator 112 may coalesce the block 210(1) and the larger block 214 to form a larger block 216 by increasing the size of the block 210(1) in the big block information 140(1) to include the size of the block 212(2), and deleting the block information 140(1) corresponding to the block 212(2). The result of the aforementioned steps is illustrated in FIG. 2C.

Figure 3:
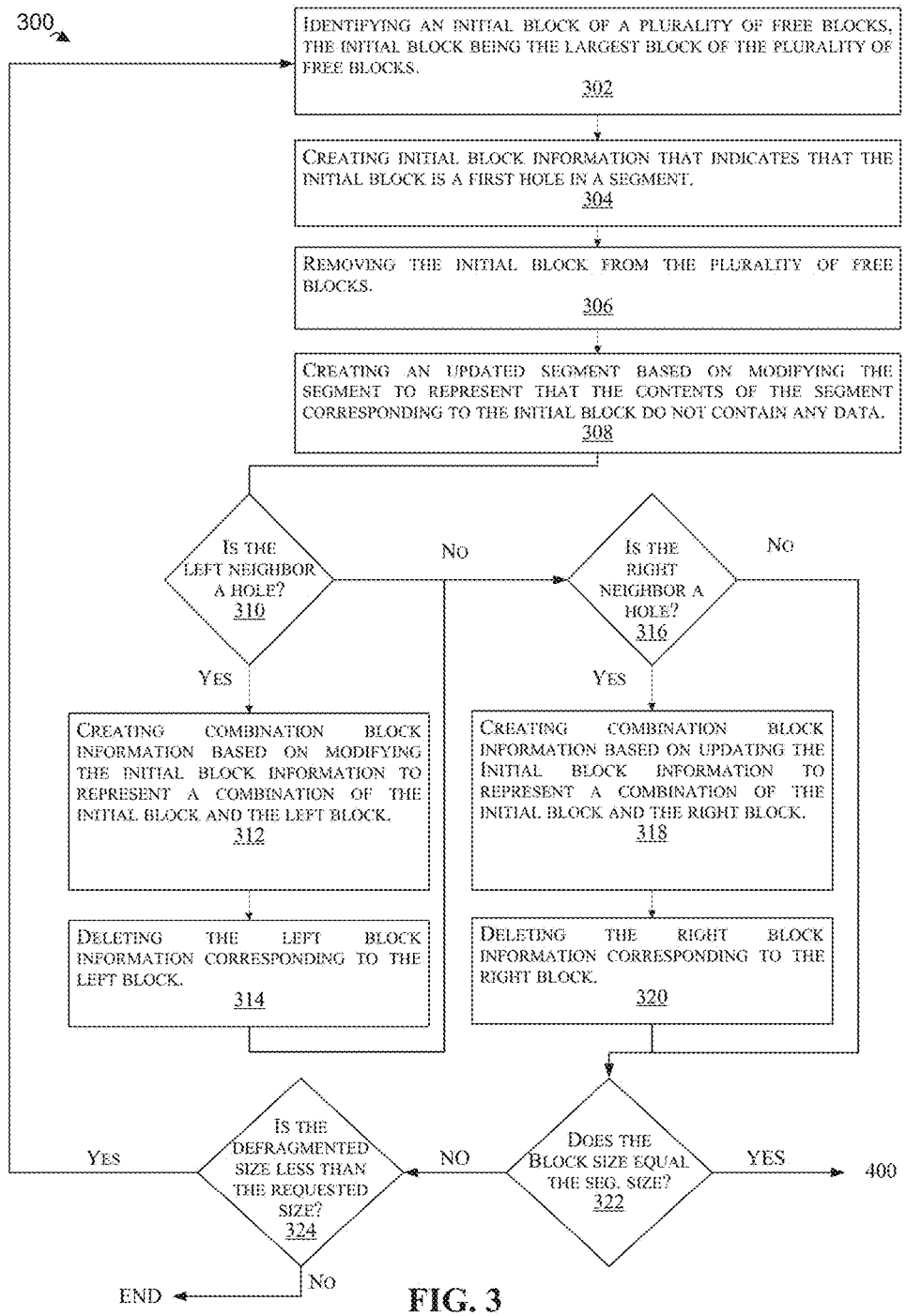
FIG. 3 is a flow diagram illustrating an example process for defragmenting persistent main memory according to some implementations.

FIG. 3 is a flowchart illustrating a process 300 for defragmenting persistent main memory, according to an example embodiment. Process 300 can be performed by processing logic that can comprise hardware (e.g., circuitry, dedicated logic, programmable logic, microcode, etc.), software (e.g., instructions run on a processing device), or a combination thereof.

At 302, a persistent allocator identifies an initial block of a plurality of free blocks, the initial block being the largest block of the plurality of free blocks. For example, the defragmenter 122 may identify that the block 210(1) is the largest block associated with the big block allocator 124(1) based on the big block information 140(1) and the free block information 142(1).

At 304, the persistent allocator creates initial block information that indicates that the initial block is a first hole in a segment. For example, the defragmenter 122 may update the big block information 140(1) associated with the block 210(1) to indicate that the block 210(1) is a hole.

At 306, the persistent allocator removes an identifier of the initial block from a list identifying the plurality of free blocks. For example, the defragmenter 122 may modify the free block information 142(1) to represent that the block 210(1) is no longer a free block.

At 308, the persistent allocator creates an updated segment based on modifying the segment to represent that the contents of the segment corresponding to the initial block do not contain any data. For instance, the defragmenter 122 may call a hole punching function on the block 210(1). As an example, the defragmenter 122 may call a fallocate command with the flags FALLOC FL PUNCH HOLE and FALLOC FL KEEP SIZE.

At 310, the persistent allocator may determine that a left block is a second hole in the updated segment based on left block information corresponding to the left block, the left block adjacent to the initial block. For example, the defragmenter 122 may identify the neighboring block 212(1) of the block 21 (1) based on the big block information 140(1). In some instances, the big block manager 138(1) may represent the big block information 140(1) as a b-tree or FP-tree. Further, the defragmenter 122 may identify the block 212(1) as being to the left of the block 210(1) based on the block 212(1) corresponding to a leaf adjacent to a leaf corresponding to the block 210(1) within the tree. Further, the defragmenter 122 may determine that the neighboring block 212 (1) is a hole based on the big block information 140(1). In some instances, the defragmenter 122 may determine that the block 212(1) is a hole based on the information stored in the leaf corresponding to the block 212(1). In some other instances, the big block manager 138(1) may represent the big block information 140(1) as a doubly linked list or any other data structure capable of representing the order of the plurality of blocks 118 within the segments 116. In the event that the neighboring block is not a hole, the defragmentation process proceeds to step 316.

At 312, the persistent allocator may create first combination block information based on modifying the initial block information to represent a first combination of the initial block and the left block. For example, the defragmenter 122 may update the size of the big block information 140(1) associated with the block 210(1) to represent the coalescing of the block 210(1) and the block 212(1).

At 314, the persistent allocator may delete the left block information corresponding to the left block. For example, the defragmenter 122 may delete the portions of the big block information 140(1) associated with the block 212(1). In some instances, the defragmenter 122 may delete a leaf node in a tree corresponding to the block 212(1).

At 316, the persistent allocator may determine that a right block is a third hole in the updated segment based on right block information corresponding to the right block, the right block adjacent to the initial block. For example, the defragmenter 122 may identify the neighboring block 212(2) of the block 210(1) based on the big block information 140(1). In some instances, the big block manager 138(1) may represent the big block information 140(1) as a b-tree or FP-tree (i.e., a hybrid SCM-DRAM b-tree). Further, the defragmenter 122 may identify the block 212(1) as being to the right of the block 210(1) based on the block 212(2) corresponding to a leaf adjacent to the leaf corresponding to the block 210(1) within the tree. Further, the defragmenter 122 may determine that the neighboring block 212(2) is a hole based on the big block information 140(1). In some instances, the defragmenter 122 may determine that the block 212(2) is a hole based on the information stored in the leaf corresponding to the block 212(2). In the event that the neighboring block is not a hole, the defragmentation process proceeds to step 322.

At 318, the persistent allocator may create second combination block information based on updating the first combination block information to represent a second combination of the initial block, the left block, and the right block. For example, the defragmenter 122 may update the size of the big block information 140(1) associated with the block 210(1) to represent the coalescing of the block 210(1), the block 212(1), and the block 212(2).

At 320, the persistent allocator may delete the right block information corresponding to the right block. For example, the defragmenter 122 may delete the portions of the big block information 140(1) associated with the block 212(2). In some instances, the defragmenter 122 may delete a leaf node in a tree corresponding to the block.

Additionally, the defragmenter 122 may determine that the right block is at the end of the updated segment. For instance, the defragmenter 122 may determine that the block 212(2) is the right most block of the segment 202. Further, the persistent allocator 112 and/or defragmenter 122 may disassociate the block 216 from a portion of a virtual address space. For example, the persistent allocator 112 and/or defragmenter 122 may remap the segment 202 and release virtual address space corresponding to the block 210(1), the block 212(1), and the block 212(2).

At 322, the persistent allocator determines whether the size of the initial block is equal to a size of the segment. If the size of the block is equal to the segment size, the defragmenter 122 proceeds to process 400. Otherwise, the process proceeds to step 324.

At 324, the persistent allocator determines whether the size of the defragmented blocks is less than a requested defragmentation size (e.g., a block size of an allocation request). If the size of the defragmented blocks is less than the requested defragmentation size, the persistent allocator may perform process 300 again, at least until there are no more free blocks identified in the free block information 140. If the size of the defragmented blocks is equal to or greater than the requested defragmentation size, the persistent allocator 112 may use the defragmented blocks to fulfill the allocation request. Further, if the free blocks associated with the big block allocator 124(1) are not enough to fulfill the request after the persistent allocator 112 performs one or more iterations of the defragmentation process 300, the persistent allocator 112 continues the defragmentation process 300 by defragmenting free blocks associated with the other big block allocators 124(2)-124(N).

Figure 4:
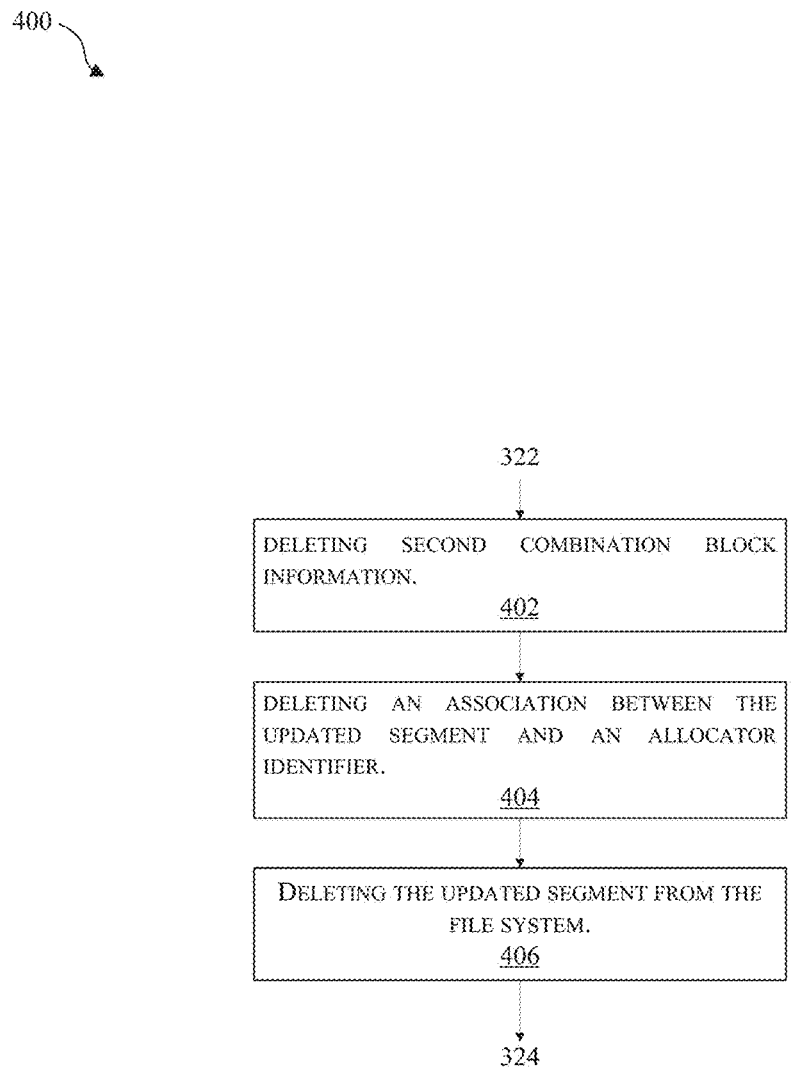
FIG. 4 is a flow diagram illustrating an example process for defragmenting persistent main memory according to some implementations.

FIG. 4 is a flowchart illustrating a process 400 for defragmenting persistent main memory, according to an example embodiment. Process 400 can be performed by processing logic that can comprise hardware (e.g., circuitry, dedicated logic, programmable logic, microcode, etc.), software (e.g., instructions run on a processing device), or a combination thereof.

At 402, a persistent allocator deletes second combination block information. For example, suppose the defragmenter 122 determines that the size of the block 216 is equal to the size of the segment 202, the defragmenter 122 can delete the information associated with the block 216. Thus, removing all of information corresponding to the block 216 from the big block information 140(1) maintained by the big block manager 138(1).

At 404, the persistent allocator deletes an association between the updated segment and an allocator identifier. For example, the defragmenter 122 and/or persistent allocator 112 may request that the transient segment manager 114 delete the association between the segment 202 and the big block allocator 124(1) stored in the segment to allocator information 130. Further, at 406, the computing system deletes the updated segment from the file system, and proceeds to step 324 of process 300.

Figure 5:
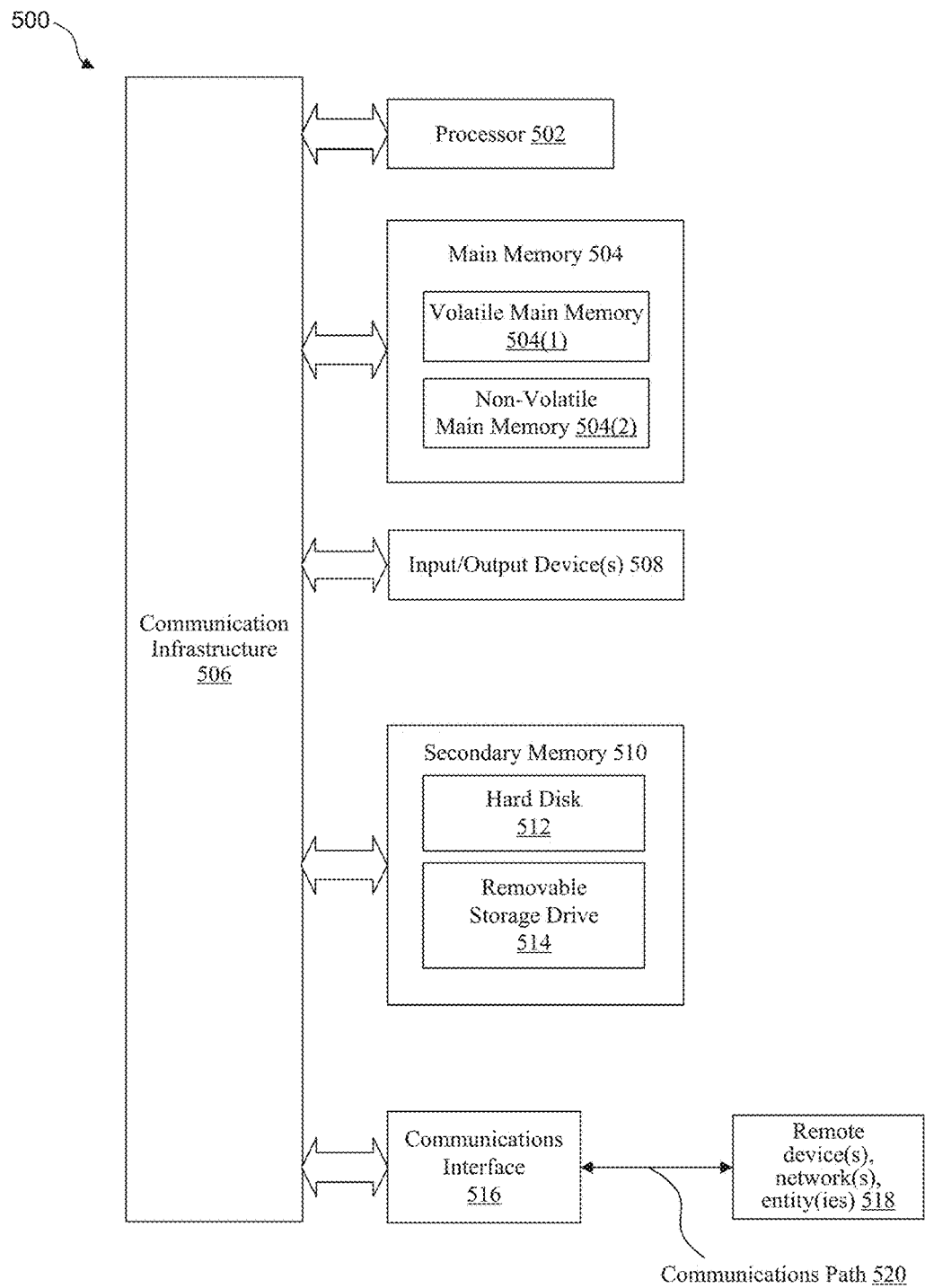
FIG. 5 illustrates select components of an example computer system useful for implementing various embodiments.

FIG. 5 is an example computer system 500 useful for implementing various embodiments. Various embodiments can be implemented, for example, using one or more well-known computer systems, such as computing system 102 shown in FIG. 1. The computer system 500 can be any well-known computer capable of performing the functions described herein.

The computer system 500 includes one or more processors 502 (also called central processing units, or CPUs), main memory 504, and a communication infrastructure 506 connected to the processors 502 and the main memory 504.

In some examples, the one or more processors 502 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

As illustrated in FIG. 5, the main memory 504 may include volatile memory 504(1), such as random access memory (RAM), and persistent main memory 504(2), such as SCM. In addition, the main memory 504 may include one or more levels of cache. Additionally, the main memory 504 has stored therein control logic (i.e., computer software) and/or data.

The computer system 500 may further be equipped with various input/output (I/O) devices 508. Such I/O devices include a display, various user interface controls (e.g., buttons, joystick, keyboard, mouse, touch screen, etc.), audio speakers, connection ports and so forth.

The computer system 500 may also include one or more secondary storage devices or memory 510. The secondary memory 510 may include, for example, a hard disk drive 512 and/or a removable storage device or drive 514. The removable storage drive 514 may be a floppy disk drive, a magnetic tape drive, a compact disk drive, an optical storage device, tape backup device, and/or any other storage device/drive. In some examples, the removable storage drive 514 may interact with a removable storage media. Some examples of removable storage media may include a floppy disk, magnetic tape, compact disk, DVD, optical storage disk, and/any other computer data storage device. The removable storage drive 514 reads from and/or writes to removable storage media in a well-known manner. Depending on the configuration of the computer system 500, the secondary memory 510 may be a type of computer-readable storage media and/or may be a tangible non-transitory media to the extent that when mentioned, non-transitory computer-readable media exclude media such as energy, carrier signals, electromagnetic waves, and signals per se.

According to an exemplary embodiment, the secondary memory 510 may include other means, instrumentalities or other approaches for allowing computer programs and/or other instructions and/or data to be accessed by computer system 500. Such means, instrumentalities or other approaches may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 500 may further include a communication or network interface 516. The communication interface 516 enables the computer system 500 to communicate and interact with any combination of remote devices, remote networks, remote entities, etc. (individually and collectively referenced by reference number 518). For example, the communication interface 516 may allow the computer system 500 to communicate with remote devices 518 over the communication(s) path 520, which may be wired and/or wireless, and which may include any combination of LANs, WANs, the Internet, etc. Control logic and/or data may be transmitted to and from the computer system 500 via the communication(s) path 520.

In an embodiment, a tangible apparatus or article of manufacture comprising a tangible computer useable or readable medium having control logic (software) stored thereon is also referred to herein as a computer program product or program storage device. This includes, but is not limited to, the computer system 500, the main memory 504, the secondary memory 510, and the removable storage drive 514, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method, comprising:
    creating initial block information that indicates that an initial block, comprising a largest block of a plurality of free blocks, is a first hole in an original segment of memory;
    creating an updated segment based on modifying the original segment to represent that contents of the original segment corresponding to the initial block do not contain any data;
    modifying free block information to represent that the initial block is not one of the plurality of free blocks;
    determining that an adjacent block adjacent to the initial block is a second hole in the updated segment based on adjacent block information corresponding to the adjacent block;
    creating first combination block information based on modifying the initial block information to represent a first combination of the initial block and the adjacent block; and
    deleting the adjacent block information corresponding to the adjacent block.

2. The method of claim 1, further comprising:
    determining that a size of the first combination of the initial block, the adjacent block is equal to a size of the updated segment;
    deleting the first combination block information; and
    deleting an association between the updated segment and an allocator identifier.

3. The method of claim 1, further comprising:
    determining that the adjacent block is at an end of the updated segment; and
    disassociating the initial block from a portion of a virtual address space.

4. The method of claim 1, wherein the adjacent block is a first adjacent block, the adjacent block information is first adjacent block information, and further comprising:
  determining that a second adjacent block is a third hole in the updated segment based on second adjacent block information corresponding to the second adjacent block, the second adjacent block adjacent to the initial block;
  creating second combination block information based on updating the first combination block information to represent a second combination of the initial block, the first adjacent block, and the second adjacent block; and
  deleting the second adjacent block information corresponding to the second adjacent block.

5. The method of claim 1, wherein the initial block and the adjacent block are included in one or more leaves of a b-tree.

6. The method of claim 1, further comprising:
  receiving a request to allocate a requested block of a first size;
  determining that a second size of the first combination of the initial block and the adjacent block is equal to the first size based on the first combination block information; and
  fulfilling the request based at least in part on the first combination of the initial block and the adjacent block.

7. The method of claim 1, wherein the creating an updated segment based on modifying the original segment to represent that contents of the original segment corresponding to the initial block do not contain any data, further comprises calling a system call to punch a hole in the initial block.

8. A non-transitory computer-readable device having instructions stored thereon that, when executed by at least one computing device, causes the at least one computing device to perform operations comprising:
  creating initial block information that indicates that an initial block, comprising a largest block of a plurality of free blocks, is a first hole in an original segment;
  modifying free block information to represent that the initial block is not one of the plurality of free blocks;
  creating an updated segment based on modifying the original segment to represent that contents of the original segment corresponding to the initial block do not contain any data;
  determining that a left block is a second hole in the updated segment based on left block information corresponding to the left block, the left block adjacent to the initial block;
  creating combination block information based on updating the initial block information to represent a combination of the initial block and the left block; and
  deleting the left block information corresponding to the left block.

9. The non-transitory computer-readable device of claim 8, wherein the combination block information is a first combination block information, the combination is a first combination, and the operations further comprising:
  determining that a right block is a third hole in the updated segment based on right block information corresponding to the right block, the right block adjacent to the initial block;
  creating second combination block information based on updating the first combination block information to represent a second combination of the initial block, the left block, and the right block; and
  deleting the right block information corresponding to the right block.

10. The non-transitory computer-readable device of claim 9, the operations further comprising:
  determining that the right block is at an end of the updated segment; and
  disassociating the initial block from a portion of a virtual address space.

11. The non-transitory computer-readable device of claim 9, the operations further comprising:
  determining that a size attribute of the second combination of the initial block, the left block, and the right block is equal to a size attribute of the updated segment;
  deleting the second combination block information;
  deleting an association between the updated segment and an allocator identifier; and
  deleting the updated segment from a file system.

12. The non-transitory computer-readable device of claim 9, wherein the creating the combination block information, further comprises:
  updating a size attribute of the initial block information to include a size of the initial block and a size of the left block.

13. The non-transitory computer-readable device of claim 8, the operations further comprising:
  receiving a request to allocate a requested block of a first size;
  determining that a second size of the combination of the initial block and the left block is equal to the first size based on the combination block information; and
  fulfilling the request based at least in part on the combination of the initial block and the left block.

14. A system, comprising:
  storage class memory including:
    an original segment that includes a plurality of blocks;
    free block information;
    block attribute information for the plurality of blocks, the block attribute information including a hole status of individual blocks of the plurality of blocks;
  dynamic random-access memory including:
    a persistent allocator that includes a block allocator;
    a mapping between the block allocator and the original segment; and
  one or more processors, wherein the one or more processors are configured to:
    modify the block attribute information to indicate that an initial block is a first hole in the original segment;
    modify the free block information to indicate that the initial block of the plurality of blocks is not a free block;
    create an updated segment based on modifying the original segment to represent that contents of the original segment corresponding to the initial block do not contain any data;
    determine that a neighboring block of the plurality of blocks is a second hole based on the block attribute information, the neighboring block adjacent to the initial block; and
    modify the block attribute information to represent a combination of the initial block and the neighboring block.

15. The system of claim 14, wherein the one or more processors are further configured to:
  receive, at the persistent allocator, a request to allocate a requested block of a first size;
  determine that a second size of the combination of the initial block and the neighboring block is equal to the first size based on the block attribute information; and fulfill the request based at least in part on the combination of the initial block and the neighboring block.

16. The system of claim 14, wherein the one or more processors are further configured to:
   receive, at the persistent allocator, a request to allocate a requested block of a particular size; and
   determine that a plurality of allocators are unable to accommodate the request based on the particular size, the plurality of allocators including the block allocator.

17. The system of claim 14, wherein the modify the block attribute information to represent a combination of the initial block and the neighboring block, further comprises:
   increasing a size of the initial block in the block attribute information by a size of the neighboring block; and
   deleting a portion of the block attribute information pertaining the neighboring block.

18. The system of claim 14, wherein the neighboring block is a first neighboring block, the combination is a first combination, and the one or more processors are further configured to:
   determine a second neighboring block is a third hole in the updated segment based on the block attribute information, the neighboring block adjacent to the initial block; and
   modify the block attribute information to represent a second combination of the initial block, the first neighboring block, and the second neighboring block.

19. The system of claim 18, wherein the block allocator is a tree-based allocator, and the initial block, the first neighboring block, and the second neighboring block are included in one or more leaves of a tree.

20. The system of claim 19, wherein the tree is a SCM-DRAM b-tree.

* * * * *